United States Patent [19]

Fisher et al.

[11] 4,211,589
[45] Jul. 8, 1980

[54] SHAFT AND UNIVERSAL JOINT ASSEMBLY

[75] Inventors: Leslie G. Fisher, Birmingham; Bertram J. Palmer, Burton on Trent, both of England

[73] Assignee: GKN Transmissions Limited, Birmingham, England

[21] Appl. No.: 876,264

[22] Filed: Feb. 9, 1978

[30] Foreign Application Priority Data

Feb. 15, 1977 [GB] United Kingdom ............... 6354/77

[51] Int. Cl.² .............. B29C 27/00; B32B 31/16; F16C 1/26; F16L 27/06
[52] U.S. Cl. .............. 156/73.5; 29/419 G; 29/458; 29/469.5; 29/505; 29/728; 29/DIG. 15; 64/2 R; 64/4; 156/172; 156/173; 156/187; 156/250; 156/293; 156/294; 285/168; 403/270; 403/281; 403/282
[58] Field of Search ............ 29/240, 419 G, 458, 29/469.5, 505, 728, DIG. 15; 64/2 R, 4; 156/73.5, 172, 173, 187, 250, 267, 293, 294; 285/163, 168; 403/270, 281, 282

[56] References Cited

U.S. PATENT DOCUMENTS

| 2,678,841 | 5/1954 | Klages | 403/270 X |
| 3,965,554 | 6/1976 | Amos | 156/73.5 X |
| 3,974,009 | 8/1976 | Butzow et al. | 156/173 X |
| 4,041,599 | 8/1977 | Smith | 29/451 |

Primary Examiner—William A. Powell
Assistant Examiner—Robert A. Dawson
Attorney, Agent, or Firm—Merriam, Marshall & Bicknell

[57] ABSTRACT

An assembly of a universal joint member and a shaft formed of fibre reinforced synthetic resin material is made by establishing an adhesive connection between the shaft and a connecting member, and subsequently welding the connecting member to the universal joint member. The connecting member may be adhered to the shaft by incorporating it in the structure of the shaft as the shaft is manufactured.

7 Claims, 6 Drawing Figures

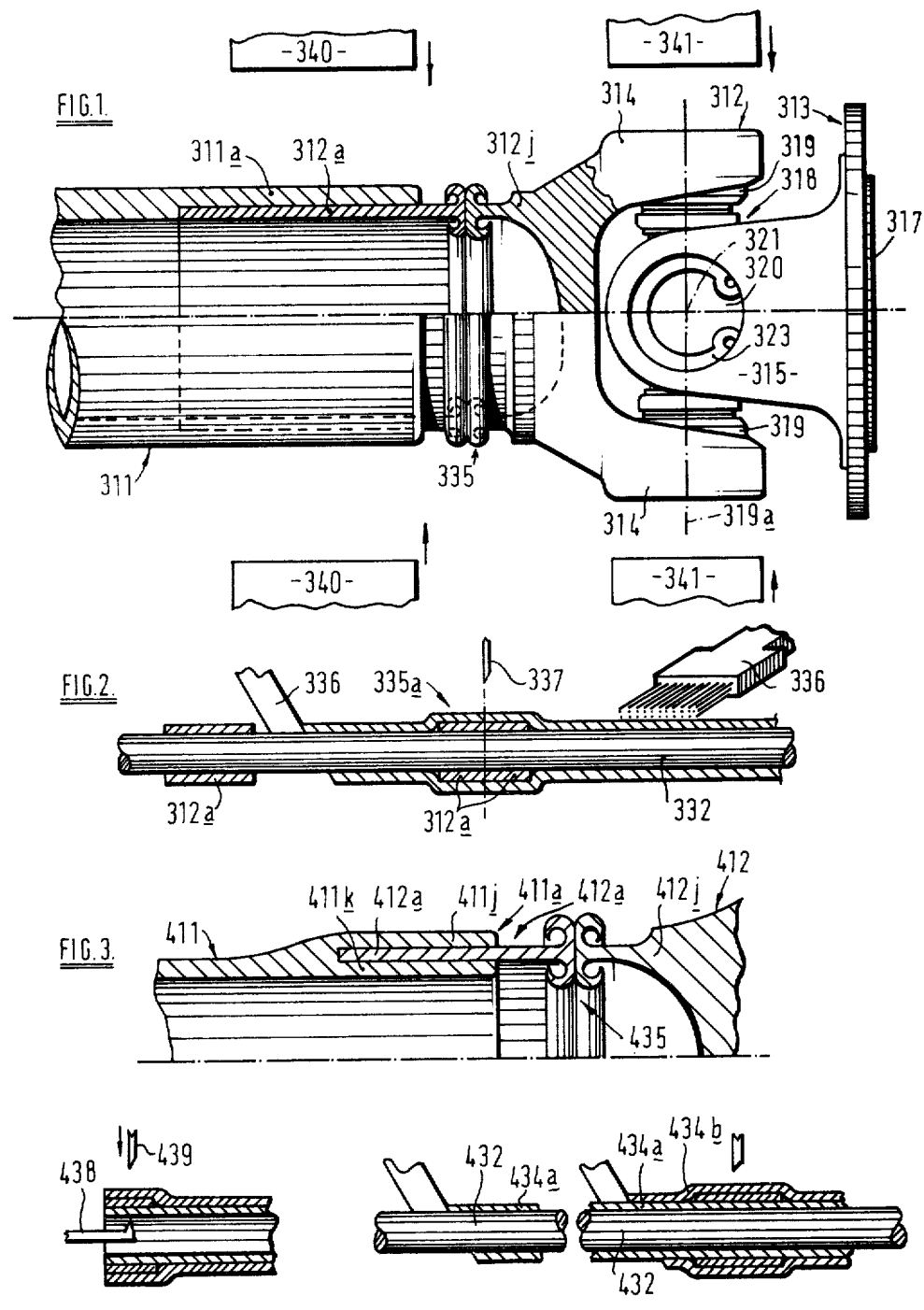

SHAFT AND UNIVERSAL JOINT ASSEMBLY

BACKGROUND TO THE INVENTION

1. Field of the Invention

This invention relates to universal joint and shaft assemblies and methods of making same. The invention has been developed primarily for application to assemblies of this kind of use in motor road or other automotive vehicles for transmitting the drive from the prime mover to driving wheels either at the rear or at the front of the vehicle.

2. Description of Prior Art.

The generally conventional practice used hitherto in the manufacture of universal joint and shaft assemblies has been to make the shaft member and the universal joint member to which it is to be connected of a ferrous metal such as steel or cast iron, and to join these members to each other by welding.

The use of welding for this purpose does represent a design constraint by reason of the fact that the materials employed for the two members must then necessarily be selected to have welding compatability. Further, the use of a ferrous metal for the manufacture of the universal joint member (or indeed the universal joint as a whole) is consequent upon the necessity in a large number of applications, such as propeller shaft and universal joint assemblies for motor vehicles, to comply with strength requirements which have to be met but the use of steel for the shaft brings an appreciable weight penalty. It has been proposed to use a fibre reinforced synthetic resin material for the shaft, but such a material cannot be welded to a metal joint member.

SUMMARY OF THE INVENTION

The present invention is based on the concept of reducing the overall mass of the assembly by using a fibre reinforced resin shaft and involves the provision of a mode of securement of the shaft to the universal joint member which overcomes the compatability constraint.

The present invention resides in a method of making an assembly of a universal joint member and a shaft formed of a fibre reinforced synthetic resin material, comprising establishing an adhesive connection between the shaft and a connecting member formed of a material capable of being welded to the universal joint member, and welding the connecting member to the universal joint member.

By virtue of such a method, the incompatability of the universal joint member and the shaft is overcome since the method permits a satisfactory adhesive connection to be made between the shaft and connecting member, and the universal joint member subsequently to be welded thereto.

The adhesive connection between the shaft and connecting member is preferably established by incorporating the connecting member in the shaft during formation of the shaft by this means a satisfactory adhesive bond between the shaft and connecting member is assisted. Such a method may comprise placing the connecting member on a mandrel, applying reinforcing fibres to the connecting member and to the mandrel to form the shaft with the connecting member set in one end thereof, impregnating the reinforcing fibres before and/or simultaneously with and/or after their application with hardenable synthetic resin, hardening the resin to form a solid matrix in which the fibres and connecting member are embedded, and removing the mandrel from the shaft and connecting member.

These and other features of the invention will now be described by way of example with reference to the accompanying drawings.

BRIEF DESCRIPTION OF DRAWINGS

FIG. 1 is a view showing respective axially interfitting parts of a shaft member and a universal joint member partly in diametral cross-section, in accordance with one embodiment of the invention;

FIG. 2 illustrates the first stage in making the assembly of FIG. 1;

FIG. 3 is a fragmentary view as FIG. 1, showing a further embodiment of the invention;

FIG. 4 illustrates the third stage of performing the method of making the assembly of FIG. 3;

FIG. 5 illustrates the first stage in making the assembly of FIG. 3;

FIG. 6 illustrates the second stage of making the assembly of FIG. 3.

DESCRIPTION OF PREFERRED EMBODIMENTS

Referring firstly to FIG. 1 of the drawings, there is illustrated an assembly which comprises a shaft 311 and a Hookes type universal joint which comprises yoke members 312 and 313. The yoke member 312 includes laterally spaced axially projecting yoke arms 314, and the yoke member 313 has similar axially projecting arms 315 extending from a base part 317 in the form of an attachment flange to enable torque to be transmitted to or from the universal joint. The two yoke members of the universal joint are joined together by a cruciform member 318 having two pairs of radially projecting spigots engaged in openings in the yoke arm through the intermediary of bearings 319, 320 the positions of which bearings along respective axes 319a, 321, are determined by circlips as 323.

The shaft member 311 is formed from a synthetic resin e.g. a polyester or epoxy resin, reinforced with an inorganic fibrous material, for example glass fibres and/or carbon fibres, while the universal joint member 312 is made of a metal, for example, a ferrous metal.

The universal joint member 312 is connected to the shaft member 311 by way of a connecting member 312a which is initially structurally separate from the joint member 312, the part 312a being secured to the shaft member 311 by bonding at the contiguous circumerential sufaces of parts 311a and 312a.

Thereafter a portion of the part 312a which projects from the extremity of the part 311a is united with part 312j, namely a tubular spigot which is formed integrally with the member 312. As illustrated, the junction may be a welded junction and 335 is a welded structure and may be formed by friction welding. Work holding heads 340,341 of the chuck type, one of which is driven relatively to the other, may be provided on a friction welding machine for holding the shaft member 311 and universal joint portion 312j to carry out the welding operation. Conventional welding, e.g. arc welding, could be employed if the materials are compatible.

The bonding of the contiguous surfaces of the parts 311a, 312a may be effected during formation of the shaft member and one manner of carrying this out is illustrated in FIG. 2.

A plurality of metal sleeves, forming two parts 312a, being the same metal as the universal joint member 312, are placed on a mandrel 332, the internal diameter of each such sleeve being such that it can be assembled as a close sliding fit onto the mandrel.

A covering 335a from which the shaft members are formed is produced by winding on a web 336 of reinforcing fibres, for example glass or carbon fibre. A plurality of layers of winding in opposite directions or hands can be carried out and thereafter, when sufficient thickness has been built up to form the shaft member, longitudinal fibres may be laid over the helically wound fibres and the whole impregnated with a suitable resin such as an epoxy resin, applied, for example, by brush 336, and which is thereafter subjected to heating to cure it. Impregnation of the fibres with the resin can alternatively or in addition be carried out before or during application thereof to the mandrel.

The sleeves may be each of a length equal to, or slightly more than, twice the length of the part 312a to be incorporated in any given shaft member, and the product illustrated in FIG. 2 may be cut, for example by a saw or other dividing tool 337, in a plane midway between the ends of each sleeve. A portion of the non-metallic shaft material is thereafter cut away adjacent to the free end (as illustrated in FIG. 4 for the embodiment of FIG. 3) so as to leave a portion of each part 312a projecting as shown in FIG. 1.

The curing treatment (heating) causes the resin to become bonded to the exterior surface of each part 312a. In many cases it may be sufficient for such bonding to be established merely by close penetration of the resin into surface irregularities of the metal sleeve forming the part 312a. If desired, however, the exterior surface of the sleeve may be knurled or otherwise deformed to provide depressions or projections producing substantially positive keying between the non-metallic material of the shaft member and the part 312a.

Alternatively, the composition of the resin may be selected in relation to the metal used for the sleeves to establish a bond by molecular linking between the contiguous surface layers.

In the modified embodiment illustrated in FIG. 3 wherein corresponding parts are designated by like references with the prefix 4 and to which the preceding description is to be deemed to apply, the sleeve from which the part 412a of the universal joint member is formed has an internal diameter somewhat larger than the diameter of the mandrel 432 and is applied over the latter, as seen in FIG. 6, only after a first layer 434a of fibres has been wound onto the mandrel as seen in FIG. 5. Such winding is continued after assembly of the sleeve to form a second layer 434b, thereby producing spaced parallel walls 411j, 411k on the shaft member between which the part 412a is received.

Curing by heating is effected after the sleeve forming the part 412a is in position and so bonding takes place between both inner and outer circumferential surfaces of the part 412a and the shaft member. Again, some deformation may be effected such as knurling these interior and exterior surfaces of the sleeve prior to assembly onto the partly formed shaft member on the mandrel.

Division may be effected at a position midway between the ends of the sleeve by a dividing tool 437 and thereafter, as seen in FIG. 11, part of the first and second layers 434a, 434b are cut away by tools 438, 439 of any suitable form.

The exposed portion of sleeve 412a, securely embedded in shaft member 411a is then welded to the remaining part 412j.

Although in the foregoing description reference has been made to the formation of the universal joint members from a ferrous metal, e.g. cast iron or steel, it is to be understood that where the torque to be transmitted admits the universal joint member could itself be formed of a light weight (low density) material. This could be an aluminium alloy. The universal joint member may be formed as a casting, and the joint between the shaft member and the universal joint member could be effected as shown in any one of the preceding embodiments.

We claim:

1. A method of making an assembly of a universal joint member and a shaft formed of fibre reinforced synthetic resin material comprising establishing an adhesive connection between the shaft and a connecting member formed of a material capable of being welded to the universal joint member, and subsequently welding the connecting member to the universal joint member.

2. A method according to claim 1 wherein the welding of the connecting member to the universal joint member is effected by friction welding.

3. A method according to claim 1 wherein the adhesive connection between the shaft and the connecting member is established by incorporating the latter in the shaft during formation of the shaft.

4. A method according to claim 3, comprising the steps of:
   (a) placing the connecting member on a mandrel;
   (b) applying reinforcing fibres to the connecting member and to the mandrel to form the shaft with the connecting member set in an end thereof;
   (c) impregnating the reinforcing fibres with hardenable synthetic resin;
   (d) hardening the synthetic resin to form a solid matrix in which the fibres and the connecting member are embedded;
   (e) removing the mandrel from the shaft and connecting member.

5. A method according to claim 4, further comrising:
   (a) initially placing a plurality of connecting members on the mandrel at spaced intervals therealong;
   (b) subsequent to removal of the mandrel, severing the resulting assembly at positions coinciding with the connecting members to form discrete tubes of fibre reinforced synthetic resin material with connecting members incorporated in each end thereof;
   (c) removing the fibre reinforced synthetic resin material immediately adjacent the ends of each tube to expose the connecting members to permit welding thereof to universal joint members.

6. A method according to claim 4, further comprising applying reinforcing fibres to the mandrel prior to placing the connecting member thereon.

7. A method according to claim 4 wherein said reinforcing fibers are wound spirally around said connecting member and said mandrel.

* * * * *